US012399478B2

(12) United States Patent
Visoky et al.

(10) Patent No.: US 12,399,478 B2
(45) Date of Patent: Aug. 26, 2025

(54) SYSTEMS AND METHODS FOR AUTOMATIC SECURITY ENFORCEMENT FOR INDUSTRIAL AUTOMATION DEVICES

(71) Applicant: ROCKWELL AUTOMATION TECHNOLOGIES, INC., Mayfield Heights, OH (US)

(72) Inventors: Jack M. Visoky, Willoughby, OH (US); Taryl J. Jasper, Concord Township, OH (US); Kyle E. Neet, Northfield, OH (US); Jessica E. Forguites, Willoughby Hills, OH (US); William J. Petro, Brecksville, OH (US); David E. Huffman, Lake Mills, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 433 days.

(21) Appl. No.: 17/864,017

(22) Filed: Jul. 13, 2022

(65) Prior Publication Data

US 2024/0019834 A1    Jan. 18, 2024

(51) Int. Cl.
*H04L 9/40*      (2022.01)
*G05B 19/05*     (2006.01)
*G05B 19/418*    (2006.01)

(52) U.S. Cl.
CPC ....... *G05B 19/058* (2013.01); *G05B 19/4185* (2013.01); *H04L 63/1416* (2013.01)

(58) Field of Classification Search
CPC .............. G05B 19/058; G05B 19/4185; H04L 63/1416; H04L 63/14; H04L 67/12;
(Continued)

(56) References Cited

U.S. PATENT DOCUMENTS 5,958,053 A * 9/1999 Denker .................. H04L 69/16
709/227
10,097,585 B2  10/2018 Bush et al.
(Continued)

FOREIGN PATENT DOCUMENTS

WO    2006/138469 A2    12/2006

OTHER PUBLICATIONS

Makrakis, G.M., et al., "Vulnerabilities and Attacks Against Industrial Control Systems and Critical Infrastructures," ARXIV.ORG, Cornell University Library, Sep. 8, 2021, 40 pages.
(Continued)

*Primary Examiner* — Christopher E. Everett
(74) *Attorney, Agent, or Firm* — Fletcher Yoder, P.C.

(57) ABSTRACT

A security device includes one or more processors and a memory that includes instructions, that when executed by the processors, cause the processors to perform operations. The operations include monitoring data traffic between industrial automation devices in an industrial system and one or more devices in an external network, determining that a first industrial automation device does not include native security features for receiving secure data from the devices in the external network or transmitting secure data to the devices in the external network, and implementing one or more security techniques in response to determining that the first industrial automation device does not include the native security features.

19 Claims, 4 Drawing Sheets

(58) Field of Classification Search
CPC ....... H04L 63/20; H04L 67/125; G06F 21/55; H04W 12/12
See application file for complete search history.

(56) References Cited

U.S. PATENT DOCUMENTS

| | | | |
|---|---|---|---|
| 2004/0107345 A1* | 6/2004 | Brandt | H04L 69/329 709/229 |
| 2007/0199061 A1* | 8/2007 | Byres | H04L 63/0263 726/11 |
| 2013/0031037 A1 | 1/2013 | Brandt et al. | |
| 2014/0282850 A1* | 9/2014 | Mattes | H04L 63/06 726/1 |
| 2016/0085972 A1* | 3/2016 | Luo | G06F 21/602 713/153 |
| 2017/0244726 A1 | 8/2017 | Finkel et al. | |
| 2017/0270295 A1* | 9/2017 | Park | G06F 21/552 |

OTHER PUBLICATIONS

Extended European Search Report for Application No. 23177226.0 mailed Nov. 3, 2023, 9 pages.

* cited by examiner

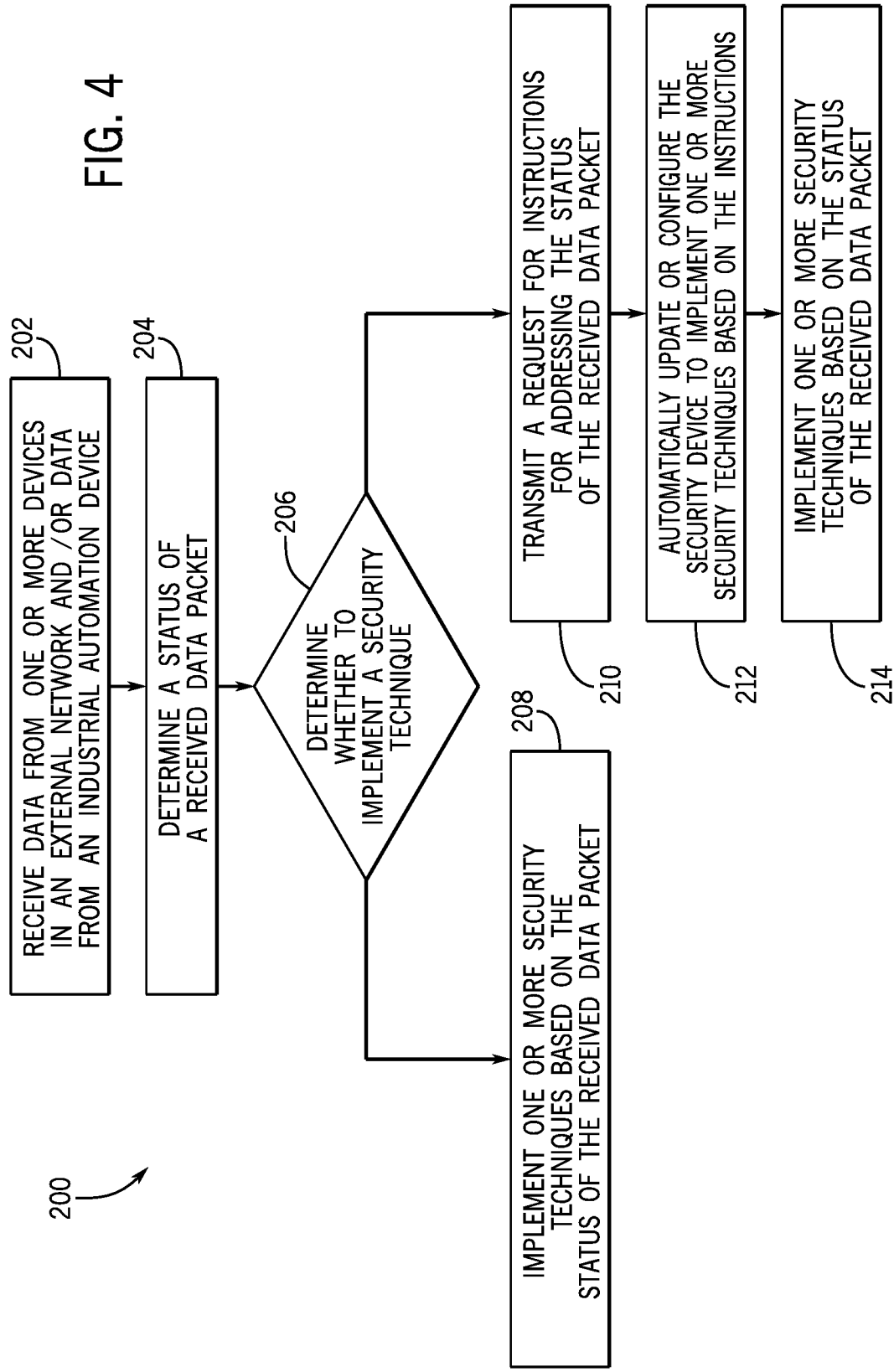

SYSTEMS AND METHODS FOR AUTOMATIC SECURITY ENFORCEMENT FOR INDUSTRIAL AUTOMATION DEVICES

BACKGROUND

The disclosure generally relates to providing various security enforcement mechanisms for industrial automation devices that lack such security enforcement capabilities. More particularly, embodiments of the present disclosure are related to automatically detecting capabilities or attributes of industrial automation devices and providing one or more security enforcement mechanisms for the industrial automation devices based on the detected capabilities or attributes.

Industrial automation systems include a variety of different industrial automation devices with different capabilities. In certain industrial automation systems, some industrial automation devices, such as legacy devices, may not provide sufficient security features for monitoring data traffic to the industrial automation devices from an external network (e.g., the Internet) or from the industrial automation devices to other industrial automation devices. The lack of security features for these types of industrial automation devices may render the industrial automation systems vulnerable to attack from malignant entities from the external network. For instance, an industrial automation device could receive malicious data from an external network and communicate the malicious data to other industrial automation devices in an industrial automation system. The spread of malicious data through the industrial automation system could then cause a variety of security issues in the industrial automation system, such as loss of control of certain functionality to installation of malware on industrial automation devices to a complete shutdown of the industrial automation system. Accordingly, it may be beneficial to provide improved security enforcement mechanisms for such industrial automation devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a security device includes one or more processors and a memory that includes instructions, that when executed by the processors, cause the processors to perform operations. The operations include monitoring data traffic between industrial automation devices in an industrial system and one or more devices in an external network, determining that a first industrial automation device does not include native security features for receiving secure data from the devices in the external network or transmitting secure data to the devices in the external network, and implementing one or more security techniques in response to determining that the first industrial automation device does not include the native security features.

In another embodiment, an industrial system includes industrial automation devices that may transmit data to one or more devices in an external network and receive data from the one or more devices in the external network, and a security device associated with the industrial automation devices. The security device includes one or more processors and a memory including instructions, that when executed by the processors, cause the processors to perform operations. The operations include receiving a first data packet being transmitted from the one or more devices in the external network to an industrial automation device, a second data packet being transmitted from the industrial automation device to the devices in the external network, or both; and determining one or more attributes associated with the industrial automation device based on the first data packet, the second data packet, or both. The one or more attributes are indicative of one or more communication protocols utilized by the industrial automation device to communicate the data to the devices in the external network. The operations also include identifying and implementing one or more security techniques based on the one or more attributes.

In yet another embodiment, a method includes receiving, by a security device associated with an industrial automation device in an industrial system, a first data packet from one or more devices in an external network, a second data packet from the industrial automation device, or both. The method also includes determining, by the security device, a first status of the first data packet, a second status of the second data packet, or both; determining, by the security device, that the security device is configured to implement one or more known security techniques based on the first status of the first data packet, the second status of the second data packet, or both; and implementing, by the security device, the known security techniques based on the first status of the first data packet, the second status of the second data packet, or both.

DRAWINGS

These and other features, aspects, and advantages of the present disclosure will become better understood when the following detailed description is read with reference to the accompanying drawings in which like characters represent like parts throughout the drawings, wherein.

Figure 3:
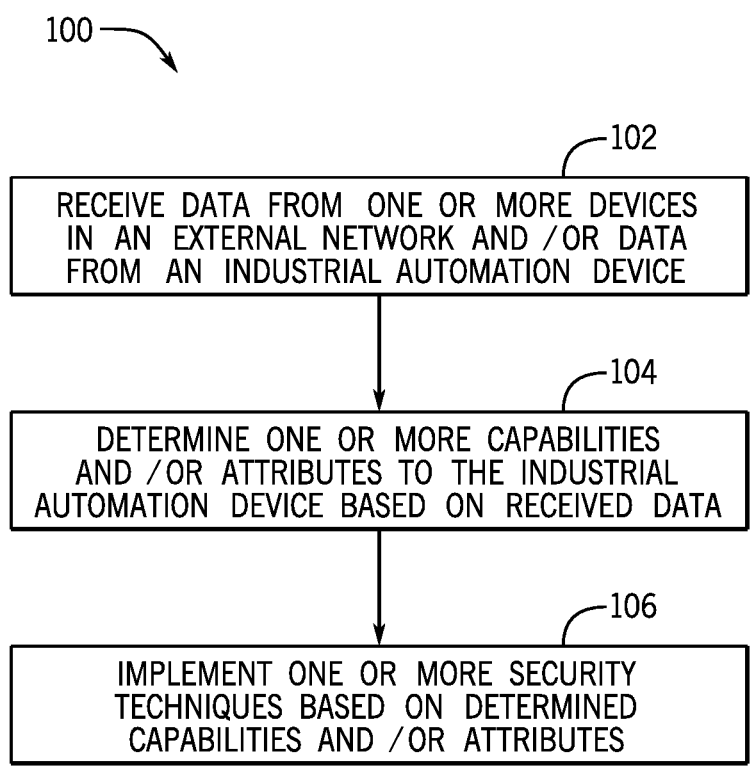

FIG. 3 is a flow chart of a process in which a security device automatically discovers one or more capabilities and/or attributes of an industrial automation device and automatically implements one or more security techniques based on the discover capabilities and/or attributes, in accordance with an embodiment; and FIG. 4 is a flow chart of a process in which a security device may automatically update or configure itself over time to provide updated or additional security techniques, in accordance with an embodiment.

DETAILED DESCRIPTION

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned above, some industrial automation devices, such as legacy devices (e.g., devices that are older, have been discontinued, have limited capabilities, etc.), may not be equipped with modern capabilities for monitoring data traffic to the industrial automation devices from an external network (e.g., the Internet) or from the industrial automation devices to other industrial automation devices. The lack of security features for these types of industrial automation devices may open the industrial automation devices (and the industrial automation systems in which the devices are implemented) to attack from malignant entities. For instance, an industrial automation device may receive malicious data from an external network and communicate the malicious data to other industrial automation devices in an industrial automation system. The spread of malicious data through the industrial automation system could then cause a variety of security issues in the industrial automation system, such as unauthorized access to the industrial automation devices, loss of control of certain functionality of the industrial automation system, installation of malware on the industrial automation devices, a complete shutdown of the industrial automation system, or the like.

Accordingly, the present disclosure is directed to a security device that provides various security techniques for monitoring data traffic to and/or from an external network associated with one or more industrial automation devices in an industrial automation system. For example, the security device may receive and monitor data from the external network that is being transmitted to the industrial automation device, data being transmitted from the industrial automation device to the external network, data being transmitted between different industrial automation devices in the industrial automation system, or the like. In certain embodiments, the security device may automatically discover one or more capabilities and/or attributes of an industrial automation device and implement one or more security techniques based on the discovered capabilities and/or attributes of the industrial automation device. For instance, the security device may automatically discover one or more communication protocols associated with the industrial automation device. The security device may then implement one or more security techniques based on the discovered communication protocols associated with the industrial automation device. In some embodiments, the security techniques may include generating and transmitting system log ("syslog") events or alerts based on the data, determining whether the data being transmitted to the industrial automation device and/or from the industrial automation device is suspicious or potentially malicious and preventing such data from being transmitted to the industrial automation device and/or from the industrial automation device, cryptographically signing the data based on the discovered protocols, or the like.

Additionally, the security device may automatically update or configure itself over time to provide additional security techniques. In certain embodiments, if the security device encounters data being transmitted via new or previously unencountered communication protocols, the security device may send a request to an external system for an update that automatically configures the security device to recognize the communication protocols and implement one or more security techniques based on the respective types of the communication protocols. In other embodiments, the security device may determine that data received from an industrial automation device and/or data being transmitted to the industrial automation device is suspicious or potentially malicious and transmit a request to the external system for an update that automatically configures the security device to implement corresponding security techniques based on the data. For instance, the external system may transmit a command or an update to the security device to generate one or more events or alerts based on the data, prevent the data from being transmitted to the industrial automation device, or the like.

Figure 1:
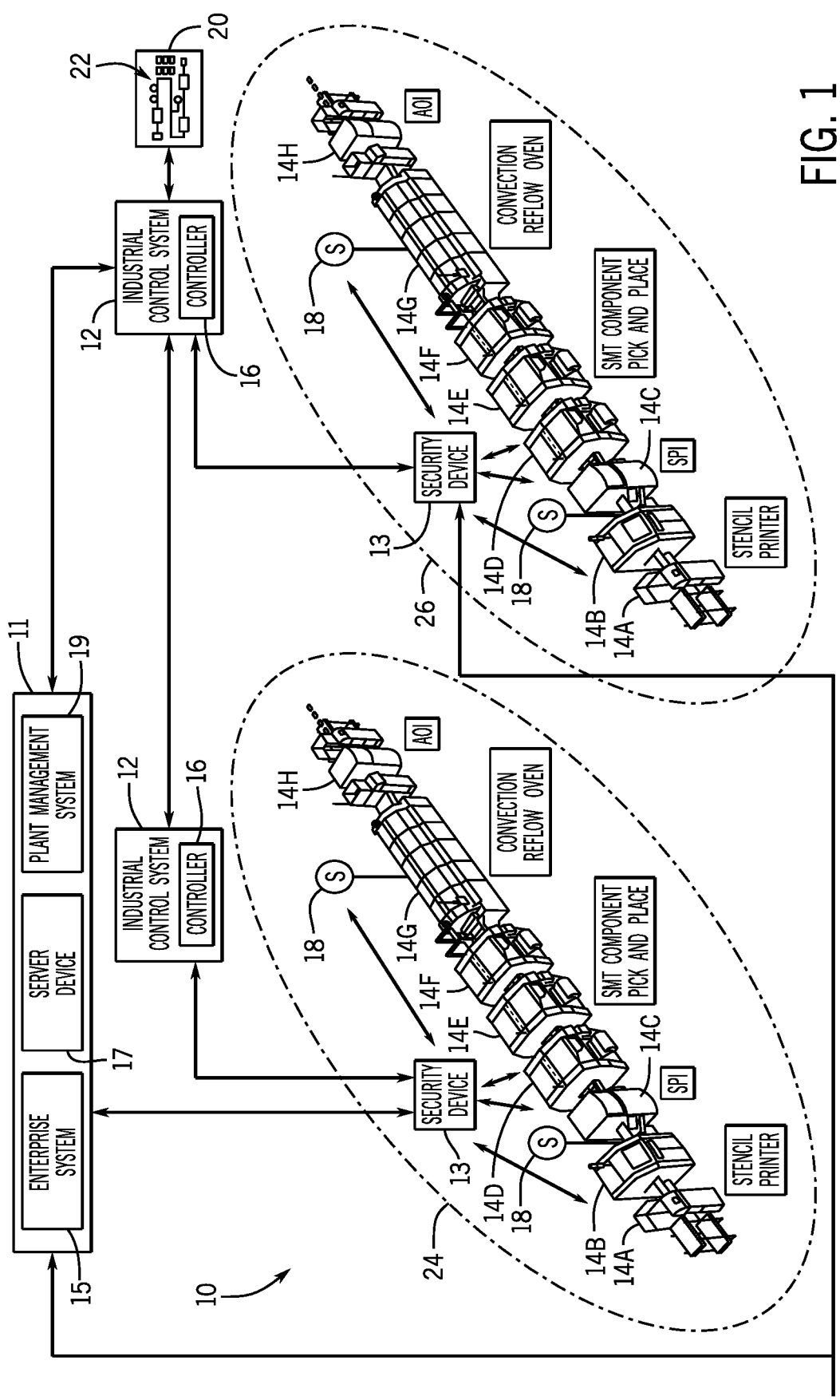
FIG. 1 is a perspective view of an example of an industrial automation system, in accordance with an embodiment.

By way of introduction, FIG. 1 is a perspective view of an example industrial automation system 10 controlled by one or more industrial control systems 12. The industrial automation system 10 includes stations 14 having machine components and/or machines (e.g., industrial automation devices) to conduct functions within an automated process, such as silicon wafer manufacturing, as is depicted. The automated process may begin at station 14A used for loading objects, such as substrates, into the industrial automation system 10 via a conveyor section. The conveyor section may transport the objects to a station 14B to perform a first action, such as printing solder paste to the substrate via stenciling. As objects exit from the station 14B, the conveyor section may transport the objects to a station 14C for solder paste inspection (SPI) to inspect printer results, to a station 14D, 14E, and 14F for surface mount technology (SMT) component placement, to a station 14G for a convection reflow oven to melt the solder to make electrical couplings, and finally to a station 14H for automated optical inspection (AOI) to inspect the object manufactured (e.g., the manufactured printed circuit board). After the objects have passed through the various stations, the objects may be removed from the station 14H, for example, for storage in a warehouse or for shipment. It should be understood, however, for other applications, the particular system, machine components, machines, stations, and/or conveyors may be different from the system depicted in FIG. 1 or spatially adapted to the application.

For example, the industrial automation system 10 may include machinery (e.g., industrial automation devices) to perform various operations in a compressor station, an oil refinery, a batch operation for making food items, pharmaceuticals, cosmetics, chemical processing operations, brewery operations, mining operations, a mechanized assembly line, and so forth. Accordingly, the industrial automation system 10 may include a variety of operational components (e.g., industrial automation devices), such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with information technology (IT) data from an IT network, for storage in an IT network, for analysis with expected operation set points (e.g., thresholds), or the like.

In certain embodiments, one or more properties of equipment of the industrial automation system 10, such as the stations 14, may be monitored and controlled by the industrial automation system 10 for regulating control variables. For example, sensing devices (e.g., sensors 18) may monitor various properties of the industrial automation system 10 and may be used by the industrial control system 12 (e.g., via a controller 16) at least in part in adjusting operations of the industrial automation system 10 (e.g., as part of a control loop). In some cases, the industrial automation system 10 may be associated with devices used by other equipment. For instance, scanners, gauges, valves, flow meters, and the like may be present on or within the industrial automation system 10. The industrial control system 12 may receive data from the machinery (e.g., devices, equipment, stations 14, and the like) and use the data to perform their respective operations more efficiently. For example, the controller 16 of the industrial control system 12 may receive data regarding a temperature of a connected motor and may adjust operations of the motor drive based on the data.

In certain embodiments, one or more industrial automation devices (e.g., stations 14, sensors 18, or the like) may be legacy devices. For example, legacy devices may include industrial automation devices that are older, that have been discontinued, that have limited capabilities, or the like. In particular, legacy devices may be configured to perform an operation associated with the industrial automation system 10 but may not have additional functionalities or capabilities associated with communication of data to a network 11, or the like. As mentioned above, such legacy devices may not be equipped with modern capabilities for monitoring data traffic received from the external network 11 (e.g., the Internet) or transmitted to other industrial automation devices. For instance, the legacy devices may be utilized within the industrial automation system 10 to perform an operation of the industrial automation system 10 but may not be configured to provide security to data transmitted to and/or from the legacy device. The lack of security features for these types of industrial automation devices may open the industrial automation devices and/or the industrial automation system 10 to attack from malignant entities.

Accordingly, one or more security devices 13 of the industrial automation system 10 may provide various security techniques for monitoring data traffic associated with the industrial automation devices. As mentioned above, the security device 13 may receive and monitor data from an external network 11 that is being transmitted to the industrial automation device, data being transmitted from the industrial automation device to the external network 11, data being transmitted between different industrial automation devices in the industrial automation system 10, or the like. It should be understood that any suitable number of security devices 13 may be used in a particular embodiment of the industrial automation system 10. As illustrated in FIG. 1, for example, the industrial automation devices of the industrial automation system 10 may be divided into multiple security zones 24, 26. Each security zone 24, 26 may include industrial automation devices that share a common security context. For instance, each security zone 24, 26 may include industrial automation devices that are configured to communicate with one another in a secure manner as part of an operation of the industrial automation system 10.

Each security zone 24, 26 may be associated with a corresponding security device 13 that receives and monitors data being transmitted to the industrial automation devices in the corresponding security zone 24, 26 and/or being received by the industrial automation devices in the corresponding security zone 24, 26. That is, the security device 13 for a particular security zone 24, 26 may provide various security techniques for the industrial automation devices in the particular zone 24, 26. In some embodiments, each security zone 24, 26 may have one or more legacy devices and one or more other industrial automation devices that is already configured to provide one or more security features for monitoring data traffic to and/or from the industrial automation devices. In such embodiments, the corresponding security device 13 for the security zone 24, 26, may provide the security techniques described herein to only the legacy devices or to both the legacy devices and the other industrial automation devices that have sufficient security features. For instance, the security device 13 may determine that an industrial automation device provides sufficient security features for data communicated via a first communication protocol utilized by the industrial automation device but that the industrial automation device does not provide sufficient security features for data communicated via a second communication protocol utilized by the industrial automation device. The security device 13 may then provide corresponding security techniques to the data being communicated via the second communication protocol utilized by the industrial automation device. In certain embodiments, the security device 13 may allow data being transmitted to an industrial automation device with sufficient security features or data being transmitted from the industrial automation device to the external network 11 without interference.

The security device 13 may automatically discover each industrial automation device associated with the security device 13 (e.g., within a particular zone 24, 26 assigned to the security device 13) and one or more attributes or capabilities associated with each industrial automation device. For instance, the security device 13 may probe each industrial automation device associated with the security device 13 for respective identifiers of each industrial automation device, networking attributes associated with each industrial automation device (e.g., IP addresses, switch and port information), types of communication protocols utilized by each industrial automation device, or the like. The security device 13 may periodically update the discovered data associated with each industrial automation device after a period of time.

In certain embodiments, the security device 13 may automatically discover one or more communication protocols associated with an industrial automation device. The security device may then implement one or more security techniques based on the discovered communication protocols associated with the industrial automation device. In some embodiments, the security techniques may include generating system log ("syslog") events based on the data, determining whether data being transmitted to the industrial automation device and/or from the industrial automation device is suspicious or potentially malicious and preventing such data from being transmitted to the industrial automation device and/or from the industrial automation device, cryptographically signing the data based on the discovered protocols, or the like.

Additionally, the security device 13 may automatically update or configure itself to provide security techniques for data being transmitted via new or previously unencountered communication protocols. In certain embodiments, the security device 13 may determine that data received from an industrial automation device and/or data being transmitted to the industrial automation device is being communicated via a communication protocol unknown to the security device 13. The security device 13 may then send a request based on the determination that the data is being communicated via the unknown communication protocol to the external network 11 and automatically receive updates from the external network 11 that configure the security device 13 to recognize the unknown communication protocol and implement one or more security techniques based on the previously unknown communication protocol. In other embodiments, the security device 13 may determine that data received from an industrial automation device and/or data being transmitted to the industrial automation device is suspicious or potentially malicious and transmit a request to the external network 11 for instructions regarding security techniques to implement to address the data. For instance, one or more computing devices in the external network 11 may transmit a command or an update to the security device 13 to generate one or more events or alerts based on the data, prevent the data from being transmitted to the industrial automation device, or the like.

As mentioned above, the security device 13 may receive an update from the external network 11 that includes an enterprise system 15, a server device 17, a plant management system 19, or the like. The enterprise system 15 may include software and/or hardware components that support business processes, information flows, reporting, data analytics, and the like. The server device 17 may include any suitable server computing device. In one embodiment, the server device 17 may include a security policy server that manages communication between the industrial automation devices of the industrial automation system 10. That is, the security policy server may manage one or more security policies that include provisions or instructions that detail how communication between the industrial automation devices is performed (e.g., security techniques to be applied to data communicated by the industrial automation devices). As such, the server device 17 may implement a security policy related to centrally managing communications between the industrial automation devices of the industrial automation system 10. The security policy may include identification data or information for industrial automation devices of the industrial automation system 10, or endpoints thereof, that are to be trusted, information regarding which communication ports to use, and the like. The plant management system 19 may include any suitable management computing system that receives data from a number of control systems (e.g., industrial control system 12), the security devices 13, or the like. As such, the plant management system 19 may track operations of a variety of facilities in various locations. In addition, the plant management system 19 may issue control commands to industrial automation devices of the industrial automation system 10.

As illustrated in FIG. 1, the industrial control system 12 may be communicatively coupled to a display/operator interface 20 (e.g., a human-machine interface (HMI)) and to devices of the industrial automation system 10 (e.g., OT assets). It should be understood that any suitable number of industrial control systems 12 may be used in a particular embodiment of an industrial automation system 10. The industrial control system 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instruction stored in the industrial control system 12 and executed by processing circuitry of the industrial control system 12. The processing circuitry may communicate with memory circuitry to permit the storage of the component visualizations.

As illustrated, the display/operator interface 20 depicts representations 22 of the components (e.g., industrial automation devices) of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., a control loop) that may be monitored and controlled by the industrial control system 12. As such, a process loop may be activated based on process inputs (e.g., an input from the sensor 18) or direct input from a person via the display/operator interface 20.

In certain embodiments, the security device 13 may transmit events or alerts to the industrial control system 12 that may be displayed to a user via the display/operator interface 20. For instance, the events or alerts may be indicative of data that has been identified by the security device 13 to be suspicious, malignant, or otherwise pose a security issue. Additionally, the security device 13 may transmit indications of whether one or more industrial automation devices have a security issue. For instance, the indications may represent that an industrial automation device has been compromised by an external entity, that data being transmitted to the industrial automation device and/or data being transmitted from the industrial automation device is suspected of being malicious, is not secure, or the like, or that the data being transmitted to the industrial automation device and/or the data being transmitted from the industrial automation device is secure.

The person operating and/or monitoring the industrial automation system 10 may reference the display/operator interface 20 to determine various statuses, states, events, alerts, and/or current operations of the industrial automation system 10, a particular industrial automation device, or the like. Furthermore, the person operating and/or monitoring the industrial automation system 10 may adjust various components (e.g., industrial automation devices) to start, stop, power-down, power-on, or otherwise adjust an operation of one or more components of the industrial automation system 10 through interactions with control panels or various input devices. In certain embodiments, the person operating and/or monitoring the industrial automation system 10 may interact with the control panels or various input devices to instruct the security device 13 to implement one or more of the security techniques described herein, to provide updates to the security device 13 to provide additional security techniques, or the like.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as operational technology (OT) data. In addition, the sensors 18 may gather OT data indicative of one or more operations of the industrial automation system 10 or the industrial control system 12. In this way, the OT data may be analog data or digital data indicative of measurements, statuses, alarms, or the like, associated with operation of the industrial automation system or the industrial control system 12.

The industrial control system 12 described above may operate in an OT space in which OT data is used to monitor and control OT assets, such as the equipment illustrated in the stations 14 of the industrial automation system 10, the security device 13, or other industrial equipment or components. The OT space, environment, or network generally includes direct monitoring and control operations that are coordinated by the industrial control system 12 and a corresponding OT asset. For example, a programmable logic controller (PLC) (e.g., controller 16) may operate in the OT network to control operations of an OT asset (e.g., drive, motor). The industrial control system 12 may be specifically programmed or configured to communicate directly with the respective OT assets.

Figure 2:
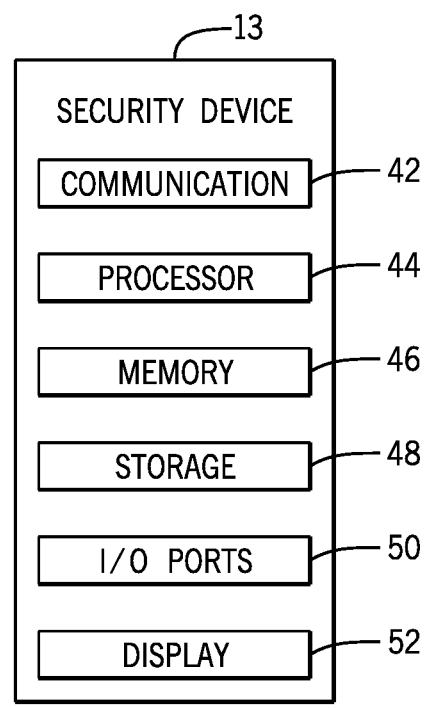
FIG. 2 is a block diagram of an example security device of the industrial automation system, in accordance with an embodiment.

With the foregoing in mind, FIG. 2 is a block diagram of an example security device 13 that may be used with the embodiments described herein. The security device 13 may include a communication component 42, a processor 44, a memory 46, a storage 48, input/output (I/O) ports 50, a display 52, and the like. The communication component 42 may be a wireless or wired communication component that facilitates communication between the security device 13 and the industrial automation devices, the security device 13 and the industrial control systems 12, the security device 13 and devices in the external network 11, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the security device 13. For example, based on a notification, an event, or an alert provided to a user via a display 20, the user may use an input device to instruct the security device 13 to implement one or more security techniques described herein, instruct the industrial control system 12 to adjust an operation of one or more industrial automation devices (e.g., shut down the industrial automation devices), or the like.

The display 52 may operate to depict visualizations associated with software or executable code being processed by the processor 44. For example, the display 52 may display a notification, an event, or an alert indicative of one or more security issues associated with the industrial automation devices. The display 52 may also display a representation of the industrial automation devices monitored by the security device 13. For instance, the representation may include respective indications of each industrial automation device monitored by the security device 13, respective indications of data flow between the industrial automation devices, between the industrial automation devices and the external network 11, between the industrial automation devices and the security device 13, or the like The representation may also include respective indications of security issues detected by the security device 13 based on data received by the security device from the external network 11 or the industrial automation devices. In one embodiment, the display 52 may be a touch display capable of receiving inputs from a user of the security device 13. The display 52 may be any suitable type of display, such as a liquid crystal display (LCD), plasma display, or an organic light emitting diode (OLED) display, for example. Additionally, in one embodiment, the display 52 may be provided in conjunction with a touch-sensitive mechanism (e.g., a touch screen) that may function as part of a control interface for the security device 13. In some embodiments, the display 52 may include the display 20 illustrated in FIG. 1. It should be noted, however, that the security device 13 may not include a dedicated display and may instead rely on a human-machine interface (HMI), a mobile device, a computer, or the like, as a display.

Although FIG. 2 is depicted with respect to the security device 13, it should be noted that the industrial control system 12 or any other suitable electronic device may also include the same or similar components to perform, or facilitate performing, the various techniques described herein. Moreover, it should be understood that the components described with respect to FIG. 1 are exemplary figures and that the security device 13 and other suitable computing systems may include additional or fewer components as detailed above.

Each industrial automation device in the industrial automation system 10 may involve communications that are formatted according to one or more OT communication protocols, such as FACTORYTALK® Live Data, EtherNet/IP, Common Industrial Protocol (CIP), OPC Direct Access (e.g., machine to machine communication protocol for industrial automation developed by the OPC Foundation), OPC Unified Architecture (OPC-UA) protocol, or any suitable OT communication protocol (e.g. DNP3, MODBUS®, Profibus, LONWORKS®, DALI, BACnet, KNX, ENOCEAN®). As mentioned above, the security device 13 may receive data from the industrial automation devices and/or the external network 11 that is formatted according to one or more communication protocols. After receiving the data formatted according to the communication protocols, the security device 13 may implement one or more security techniques described herein based on the respective types of the communication protocols.

With the foregoing in mind, FIG. 3 illustrates a method 100 in which the security device 13 automatically discovers one or more capabilities and/or attributes of an industrial automation device and automatically implements one or more security techniques based on the discovered capabilities and/or attributes of the industrial automation device. Although the following description of the method 100 is described as being performed by the security device 13, it should be understood that any suitable computing device that is configured to interface with the industrial automation devices of the industrial automation system 10 and the external network 11 may perform the operations described herein.

At block 102, the security device 13 may receive data from one or more devices in the external network 11, receive data from an industrial automation device, receive data from the industrial control system 12, or any combination thereof. As mentioned above, the security device 13 monitors data traffic to the industrial automation device and from the industrial automation device. For instance, one or more devices (e.g., an enterprise system 15, a server device 17, or a plant management system 19) in the external network 11 may issue commands to the industrial automation device to perform an operation in the industrial automation system 10. Additionally, or alternatively, the industrial automation device may transmit status data or operational data to the devices in the external network 11 or to one or more other industrial automation devices in the industrial automation system 10. Further, the security device 13 may receive metadata directly from the industrial automation device indicative of one or more attributes of the industrial automation device. For example, the attributes of the industrial automation device may include one or more communication protocols used by the industrial automation device, one or more types of ports utilized by the industrial automation device, or the like.

After receiving the data from the devices in the external network 11 and/or the industrial automation device, or both, at block 104, the security device 13 may determine one or more capabilities and/or attributes of the industrial automation device based on the received data. In certain embodiments, the capabilities and/or attributes of the industrial automation device may include one or more communication protocols utilized by the industrial automation device to communicate with the devices in the external network 11 and/or the other industrial automation devices in the industrial automation system 10. As mentioned above, the security device 13 may identify the communication protocols utilized by the industrial automation device based on the format of the received data. For instance, the data may be formatted according to the following communication protocols: communication protocols, such as FACTORYTALK® Live Data, EtherNet/IP, Common Industrial Protocol (CIP), OPC Direct Access (e.g., machine to machine communication protocol for industrial automation developed by the OPC Foundation), OPC Unified Architecture (OPC-UA) protocol, or any suitable OT communication protocol (e.g. DNP3, MODBUS®, Profibus, LONWORKS®, DALI, BACnet, KNX, ENOCEAN®).

Based on the capabilities and/or attributes of the industrial automation device, at block 106, the security device 13 may implement one or more security techniques. In certain embodiments, the security device 13 may perform data packet filtering techniques, such as deep packet inspection (DPI). For instance, the security device 13 may identify and classify suspicious data, reroute the suspicious data (e.g., to another computing device for analysis), prevent the suspicious data from being transmitted to an intended recipient (e.g., the industrial automation devices or the devices in the external network 11), or the like. In other embodiments, the security device 13 may prevent data formatted in accordance with one or more communication protocols from being transmitted to the industrial automation device or from the industrial automation device. For instance, the communication protocols may include unsecured communication protocols or communication protocols that are not supported within the industrial automation system Additionally, or alternatively, the security device 13 may generate notifications, events, or alerts that are indicative of the type of data being transmitted to the industrial automation device and/or the type of data being transmitted from the industrial automation device. For instance, the security device 13 may generate notification, events, or alerts that indicate whether the data is suspected of being malicious or is known to be malicious, whether the industrial automation device has been compromised or is otherwise experiencing a security issue, or the like. In certain embodiments, the security device 13 may generate system log ("Syslog") events indicative of a change in topology of the industrial automation devices in the industrial automation system 10, removal of an industrial automation device from the industrial automation system 10, an unresponsive industrial automation device, removal of an industrial automation device from the industrial automation system 10 that has native security features, an unresponsive industrial automation device that has native security features, an additional of an industrial automation device to the industrial automation system 10, a quantity of data traffic on a particular network utilized by the industrial automation system 10, replacement of an industrial automation device with another industrial automation device, or the like, The security device 13 may transmit the notifications, events, or alerts to one or more devices in the external network 11, the industrial control system 12, or the like.

The security device 13 may also reformat the data received from the industrial automation device or reformat the data being transmitted to the industrial automation device. For instance, the data received by the security device 13 may be formatted in accordance with a particular communication protocol. After receiving the data, the security device 13 may determine that the data is formatted in the particular communication protocol and reformat the data in accordance with a secure version of the communication protocol. For example, the security device 13 may reformat data being transmitted in accordance with an EtherNet/IP protocol to data being transmitted in accordance with a CIP Security protocol, the security device 13 may reformat data being transmitted in accordance with a HTTP protocol to data being transmitted in accordance with a HTTPS protocol, or the like. Further, the security device 13 may cryptographically sign the data using any suitable cryptography scheme. For example, the security device 13 may encrypt the data in accordance with one or several encryption or cryptographic algorithms or protocols, such as Transport Layer Security (TLS), Secure Sockets Layer (SSL), Triple Data Encryption Algorithm (TDEA), Advanced Encryption Standard (AES), or public key system (e.g., Rivest-Shamir-Adleman (RSA) system, elliptic-curve cryptography (ECC), or the like). In certain embodiments, the security device 13 may generate and include a cryptographic token, a cryptographic key, a hash, a string, or the like, with a particular data packet or data transmission for subsequent decryption by receiving devices. It should be understood that the security techniques described herein are exemplary and that other security techniques may be implemented by the security device 13 based on the data received from the industrial automation device and/or the external network 11.

Additionally, as mentioned above, the security device 13 may automatically update or configure itself over time to provide updated or additional security techniques. With the foregoing in mind, FIG. 4 illustrates a method 200 in which the security device 13 may detect unknown or suspicious data and transmit a request to one or more devices in the external network 11 (e.g., a cloud system) for an update to automatically configure the security device 13 to perform one or more security techniques based on the detected data. Although the following description of the method 200 is described as being performed by the security device 13, it should be understood that any suitable computing device that is configured to interface with the industrial automation devices of the industrial automation system 10 and the external network 11 may perform the operations described herein. In addition, although the method 200 is described in particular order, it should be understood that the method 200 may be performed in any suitable order.

At block 202, the security device 13 may receive data from one or more devices in the external network 11, receive data from an industrial automation device, or both. As mentioned above, the security device 13 monitors data traffic to the industrial automation device and from the industrial automation device. For instance, one or more devices (e.g., an enterprise system 15, a server device 17, or a plant management system 19) in the external network 11 may issue commands to the industrial automation device to perform an operation in the industrial automation system 10. Additionally, or alternatively, the industrial automation device may transmit status data or operational data to the devices in the external network 11 or to one or more other industrial automation devices in the industrial automation system 10.

After receiving the data from the external network 11 and/or the industrial automation device, at block 204, the security device 13 may determine a status of the received data. For instance, the security device 13 may determine whether a data packet being transmitted to the industrial automation device or from the industrial automation device is malicious, suspicious, anomalous, or may otherwise pose a security threat to the industrial automation system 10 and/or the industrial automation devices within the industrial automation system 10. In certain embodiments, the security device 13 may determine that the data packet has an unknown format that the security device 13 does not recognize. For instance, the data packet may be formatted in a new communication protocol that the security device 13 has not encountered before. In other embodiments, the security device 13 may determine that the data packet includes data that is different from a typical set of data that may be received by the industrial automation device or transmitted from the industrial automation device. For instance, the data packet may include one or more indicators of malicious data, such as an originating address from an unknown sender, an originating address from an unknown IP address, or the like.

After determining a status of a received data packet, at block 206, the security device 13 may determine whether the security device 13 is configured to implement one or more security techniques to address the status of the received data packet. First, if the security device 13 is configured to implement to address the status of the received data packet, at block 208, the security device 13 may implement one or more of the security techniques described herein to address the status of the received data packet. For example, if the received data packet is malicious, the security device 13 may determine to prevent the data packet from being transmitted to the industrial automation device or from being transmitted to the external network 11, generate an alert indicative of the determination that the data packet is malicious, or the like. If the received data packet is formatted in accordance with an unsecure communication protocol, the security device 13 may reformat the data packet in accordance with the secure version of the communication protocol, or the like.

Second, if the security device 13 is not configured to address the status of the received data packet, at block 210, the security device 13 transmits a request to one or more devices in the external network (e.g., the enterprise system 15, the server device 17, or the plant management system 19) for instructions for addressing the status of the received data packet. In certain embodiments, the instructions may include an update to the security device 13 that configures the security device 13 to implement one or more security techniques based on the status of the received data packet. For instance, if the data packet has an unknown format that the security device 13 does not recognize, the security device 13 may receive an update that configures the security device 13 to recognize the corresponding communication protocol that was previously unknown to the security device 13. Additionally, or alternatively, the update may configure the security device 13 to implement one or more security techniques to address the status of the received data. For instance, the security device 13 may be configured to implement one or more known security techniques to address the status of the received data, or the security device 13 may be configured to implement one or more additional security techniques that are different from the security techniques known to the security device 13. It should be understood that the known security techniques and the additional security techniques may include any of the security techniques described herein or any other suitable security technique.

In any case, after receiving the instructions for addressing the status of the received data packet from the devices in the external network, at block 212, the security device 13 may automatically update or configure itself to implement one or more security techniques to address the status of the received data packet based on the instructions. As mentioned above, the security techniques may include security techniques known to the security device 13 or additional security techniques that were previously unknown to the security device 13. After automatically updating or configuring itself, at block 214, the security device 13 may implement one or more security techniques based on the status of the received data packet. As mentioned above, the security techniques may be any of the security techniques described herein (e.g., with respect to FIG. 3 above).

In certain embodiments, the security device 13 may utilize machine learning techniques to automatically detect different types of data that may be transmitted to the industrial automation device or transmitted from the industrial automation device. For instance, the security device 13 may monitor data traffic to and from the industrial automation device to identify patterns in data identified to be anomalous or suspicious. Additionally, the security device 13 may be trained with historical data to learn which security techniques to apply to different types of data. In some embodiments, training data may be provided by the enterprise or a service provider. It should be noted that any suitable machine learning technique may be utilized to train the security device 13.

Technical effects of the present disclosure include providing a security device that implements various security techniques for monitoring data traffic to and/or from an external network associated with one or more industrial automation devices in an industrial automation system. The security device may automatically discover one or more capabilities and/or attributes of an industrial automation device and implement one or more security techniques based on the discovered capabilities and/or attributes of the industrial automation device. Additionally, the security device may automatically update or configure itself over time to provide updated or additional security techniques. For example, if the security device encounters data being transmitted via new or previously unencountered communication protocols, the security device may send a request to an external system for an update that automatically configures the security device to recognize the communication protocols and implement one or more security techniques based on the respective types of the communication protocols. In this way, the security device may provide sufficient security features to industrial automation devices that do not natively possess such features. Accordingly, the security device may prevent possible attack from malignant entities that may otherwise exploit unsecured data traffic to and/or from the industrial automation devices in the industrial automation system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A security device, comprising:
one or more processors; and
a memory comprising instructions, that when executed by the one or more processors, cause the one or more processors to perform operations comprising:
monitoring data traffic between a plurality of industrial automation devices in an industrial system and one or more devices in an external network;
identifying one or more respective communication protocols associated with each industrial automation device of the plurality of industrial automation devices based on the data traffic;
determining that a first industrial automation device of the plurality of industrial automation devices does not include native security features for receiving secure data from the one or more devices in the external network or transmitting secure data to the one or more devices in the external network based on one or more communication protocols associated with the first industrial automation device; and
identifying and implementing one or more security techniques based on the one or more communication protocols associated with the first industrial automation device in response to determining that the first industrial automation device does not include the native security features.

2. The security device of claim 1, wherein the operations comprise receiving metadata from the first industrial automation device, and wherein the one or more processors are configured to identify the one or more communication protocols associated with the first industrial automation device based on the received metadata.

3. The security device of claim 1, wherein the one or more security techniques comprise one or more of:
preventing a first data packet from being received by the one or more devices, preventing a second data packet from being received by the first industrial automation device, or both;
generating an alert indicative a presence of malicious data in the first data packet, the second data packet, or both; and
reformatting the first data packet, the second data packet, or both, in accordance with a secured version of a communication protocol utilized by the first industrial automation device.

4. The security device of claim 1, wherein the operations comprise determining that a second industrial automation device of the plurality of industrial automation device includes native security features for receiving secure data from the one or more devices in the external network or transmitting secure data to the one or more devices in the external network.

5. The security device of claim 4, wherein the security device is configured to allow the secure data to be received by the second industrial automation device, the one or more devices in the external network, or both, without interference.

6. An industrial system, comprising:
a plurality of industrial automation devices configured to transmit data to one or more devices in an external network and receive data from the one or more devices in the external network; and
a security device associated with the plurality of industrial automation devices, wherein the security device comprises one or more processors and a memory comprising instructions, that when executed by the one or more processors, cause the one or more processors to perform operations comprising:
receiving a first data packet being transmitted from the one or more devices in the external network to an industrial automation device of the plurality of industrial automation devices, a second data packet being transmitted from the industrial automation device to the one or more devices in the external network, or both;
determining one or more communication protocols associated with the industrial automation device based on the first data packet, the second data packet, or both;
determining that the industrial automation device does not include native security features for receiving secure data from the one or more devices in the external network or transmitting secure data to the one or more devices in the external network based on the one or more communication protocols; and
identifying and implementing one or more security techniques based on the one or more communication protocols in response to determining that the industrial automation device does not include the native security features.

7. The industrial system of claim 6, wherein the one or more security techniques comprise preventing the first data packet from being received by the one or more devices, preventing the second data packet from being received by the industrial automation device, or both.

8. The industrial system of claim 7, wherein the first data packet, the second data packet, or both, are formatted in accordance with an unsecured communication protocol.

9. The industrial system of claim 6, wherein the operations comprise determining that the first data packet, the second data packet, or both, include malicious data, and wherein the one or more security techniques comprise generating an alert indicative of the determination that the first data packet, the second data packet, or both, include the malicious data.

10. The industrial system of claim 6, wherein the one or more security techniques comprise reformatting the first data packet, the second data packet, or both, in accordance with respective secured versions of the one or more communication protocols.

11. The industrial system of claim 6, comprising a second plurality of industrial automation devices and a second security device, wherein the plurality of industrial automation devices and the second plurality of industrial automation devices are associated with respective zones in the industrial system, wherein the security device is configured to monitor data traffic associated with the first plurality of industrial automation devices in a first zone of the respective zones and wherein the second security device is configured to monitor data traffic associated with the second plurality of industrial automation devices in a second zone of the respective zones.

12. The industrial system of claim 6, wherein the one or more communication protocols comprise a plurality of communication protocols, and wherein the one or more security techniques are implemented based on the plurality of communication protocols.

13. A method, comprising:
receiving, by a security device associated with an industrial automation device in an industrial system, a first data packet from one or more devices in an external network, a second data packet from the industrial automation device, or both;
identifying one or more communication protocols associated with the industrial automation device based on the first data packet, the second data packet, or both;
determining, by the security device, a first status of the first data packet, a second status of the second data packet, or both;
determining, by the security device, that the industrial automation device does not include native security features for receiving secure data from the one or more devices in the external network or transmitting secure data to the one or more devices in the external network based on the one or more communication protocols; and
in response to determining that the industrial automation device does not include the native security features:
determining, by the security device, that the security device is configured to implement one or more known security techniques based on the one or more communication protocols associated with the industrial automation device and the first status of the first data packet, the second status of the second data packet, or both; and
implementing, by the security device, the one or more known security techniques based on the one or more communication protocols associated with the industrial automation device and the first status of the first data packet, the second status of the second data packet, or both.

14. The method of claim 13, comprising:
determining, by the security device, that the security device is not configured to implement the one or more known security techniques based on the one or more communication protocols associated with the industrial automation device and the first status of the first data packet, the second status of the second data packet, or both; and
transmitting, by the security device, a request to a cloud computing system for an update to the security device based on the one or more communication protocols associated with the industrial automation device and the first status of the first data packet, the second status of the second data packet, or both.

15. The method of claim 14, comprising automatically updating the security device based on an update received from the cloud computing system, wherein the security device is configured to implement one or more additional security techniques based on the one or more communication protocols associated with the industrial automation device and the first status of the first data packet, the second status of the second data packet, or both.

16. The method of claim 15, comprising automatically implementing the one or more additional security techniques based on the one or more communication protocols associated with the industrial automation device and the first status of the first data packet, the second status of the second data packet, or both.

17. The method of claim 16, wherein the one or more additional security techniques comprise one or more of:
preventing the first data packet from being received by the industrial automation device, preventing the second data packet from being received by the one or more devices in the external network, or both;
generating an alert indicative of the first status of the first data packet, the second status of the second data packet, or both; and
reformatting the first data packet, the second data packet, or both, in accordance with a secured version of a communication protocol utilized by the industrial automation device.

18. The method of claim 13, wherein the first status of the first data packet is indicative of a first unsecure communication protocol used to format the first data packet, the second status of the second data packet is indicative of a second unsecure communication protocol used to format the second data packet, or both.

19. The method of claim 13, wherein the first status of the first data packet is indicative of a first presence of suspicious or anomalous data in the first data packet, the second status of the second data packet is indicative of a second presence of suspicious or anomalous data in the second data packet, or both.

* * * * *